(12) United States Patent
Yang et al.

(10) Patent No.: US 12,231,341 B2
(45) Date of Patent: Feb. 18, 2025

(54) METHOD AND APPARATUS FOR IMPROVED PACKET DETECTION RULE PROVISION

(71) Applicant: Telefonaktiebolaget LM Ericsson (publ), Stockholm (SE)

(72) Inventors: Yong Yang, Kållered (SE); Yunjie Lu, Shanghai (CN); Qian Chen, Mölndal (SE); Erik Wikström, Gothenburg (SE); Juying Gan, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 255 days.

(21) Appl. No.: 17/635,455

(22) PCT Filed: Aug. 10, 2020

(86) PCT No.: PCT/CN2020/108191
§ 371 (c)(1),
(2) Date: Feb. 15, 2022

(87) PCT Pub. No.: WO2021/031903
PCT Pub. Date: Feb. 25, 2021

(65) Prior Publication Data
US 2022/0294739 A1 Sep. 15, 2022

(30) Foreign Application Priority Data
Aug. 16, 2019 (WO) .............. PCT/CN2019/101117

(51) Int. Cl.
*H04L 47/24* (2022.01)
*H04L 12/14* (2006.01)
*H04L 45/42* (2022.01)
*H04L 47/20* (2022.01)

(52) U.S. Cl.
CPC .......... *H04L 47/24* (2013.01); *H04L 12/1407* (2013.01); *H04L 45/42* (2013.01); *H04L 47/20* (2013.01)

(58) Field of Classification Search
None
See application file for complete search history.

(56) References Cited

U.S. PATENT DOCUMENTS 10,681,222 B2   6/2020   Yan et al.
2016/0381706 A1  12/2016  Huang et al.
(Continued)

FOREIGN PATENT DOCUMENTS

CN   109429363 A    3/2019
JP   2019-534601 A  11/2019

OTHER PUBLICATIONS

Ericsson, Change Request C4-193707, F-TEID in a PDR, 3GPP TSG-CT WG4 Meeting #93, Wroclaw, Poland, Aug. 26-30, 2019, pp. 1-11 (Year: 2019).*

(Continued)

*Primary Examiner* — Benjamin Lamont
(74) *Attorney, Agent, or Firm* — Rothwell, Figg, Ernst & Manbeck, P.C.

(57) ABSTRACT

Various embodiments of the present disclosure provide methods and apparatuses for improved packet detection rule provision. A method performed by a first network entity comprises: transmitting packet detection information, PDI, to a second network entity, wherein the PDI indicates information on one or more traffic endpoints on which packets are to be detected.

19 Claims, 7 Drawing Sheets

(56) References Cited

U.S. PATENT DOCUMENTS

2018/0199243 A1     7/2018   Bharatia
2020/0128087 A1     4/2020   Yu et al.

OTHER PUBLICATIONS

International Search Report and Written Opinion issued in International Application No. PCT/CN2020/108191, dated Nov. 12, 2020 (8 pages).
Ericsson, "UE IP address Pool Identity", 3GPP TSG-CT WG4 Meeting #95, C4-195408, Reno, US, Nov. 2019 (7 pages).
Huawei, "PDR association with UPF tunnel change", 3GPP TSG CT WG4 Meeting #85bis, C4-185299, Sopia Antipolis, France, Jul. 2018 (8 pages).
Ericsson, "Framed-Route and Framed-IPv6-Route in a PDR", 3GPP TSG-CT WG4 Meeting #91, C4-192394, Reno, US, May 2019 (8 pages).
3GPP TS 23.502 V16.0.0 (Mar. 2019), 3rd Generation Partnership Project; Technical Specification Group Services and System Aspects; Procedures for the 5G System; Stage 2, Mar. 2019 (420 pages).
3GPP TS 29.244 V16.0.0 (Jun. 2019), 3rd Generation Partnership Project; Technical Specification Group Core Network and Terminals; Interface between the Control Plane and the User Plane Nodes; Stage 3, Jun. 2019 (217 pages).
Ericsson, "Framed-Route and Framed-IPV6-Route in a PDR", 3GPP TSG-CT WG4 Meeting #91, C4-192264, Reno, US, May 13-17, 2019 (8 pages).

* cited by examiner

METHOD AND APPARATUS FOR IMPROVED PACKET DETECTION RULE PROVISION

CROSS REFERENCE TO RELATED APPLICATIONS

This application is a 35 U.S.C. § 371 National Stage of International Patent Application No. PCT/CN2020/108191, filed Aug. 10, 2020, which also claims priority to Chinese Patent Application No. PCT/CN2019/101117, filed on Aug. 16, 2019. The above identified applications are incorporated by this reference.

FIELD OF THE INVENTION

The present disclosure generally relates to wireless communications, and more specifically, to a method and apparatus for improved packet detection rule provision.

BACKGROUND

This section introduces aspects that may facilitate a better understanding of the disclosure. Accordingly, the statements of this section are to be read in this light and are not to be understood as admissions about what is in the prior art or what is not in the prior art.

In a communication system, such as Evolved Packet System or the $5^{th}$ generation (5G) system or a 4G/5G fusion networking and interworking system, in particular Evolved Packet Core (EPC) or 5G Core (5GC), according to 3GPP TS29.244 V16.0.0, a packet detection rule (PDR) is used to detect an incoming packet so that a corresponding enforcement policy with respect to e.g. quality of service (QoS), charging, or packet forwarding action can be applied to the packet. Generally the PDR is provisioned by a control plane (CP) function (which is also referred to as CP network entity) to a user plane (UP) function (which is also referred to as UP network entity).

Each PDR shall contain packet detection information (PDI), i.e. one or more match fields against which incoming packets are matched, and may be associated to rules providing a set of instructions to apply to packets matching the PDI.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Various embodiments of the present disclosure provide improved PDR provision solutions, which can optimize signaling of the PDR provision from the CP function to the UP function.

According to a first aspect of the present disclosure, there is provided a method performed by a first network entity. The method comprises transmitting packet detection information (PDI) to a second network entity, wherein the PDI indicates information on one or more traffic endpoints on which packets are to be detected.

In accordance with an exemplary embodiment, the PDI may comprise one or more traffic endpoint identifiers identifying the one or more traffic endpoints.

In accordance with an exemplary embodiment, each of the traffic endpoint identifiers may correspond to a set of parameters comprising at least one of: a local fully-qualified tunnel endpoint identifier, F-TEID, a network instance, a user equipment IP address, Ethernet protocol data unit, PDU, session information, a framed-route, a framed-routing, and a framed-IPv6-route.

In accordance with an exemplary embodiment, the local F-TEID may further indicate whether a quality-of-service (QoS) flow identifier included in the PDI is applicable for the packets to be detected on a traffic endpoint identified by the local F-TEID.

In accordance with an exemplary embodiment, the set of parameters may further comprise an indication indicating whether a quality-of-service, QoS, flow identifier included in the PDI is applicable for the packets to be detected on a traffic endpoint identified by the traffic endpoint identifier.

In accordance with an exemplary embodiment, the set of parameters may further comprise a QoS flow identifier while the QoS flow identifier is not included in the PDI.

In accordance with an exemplary embodiment, the PDI may comprise at least one of the following for indicating the one or more traffic endpoints: one or more local F-TEIDs, one or more user equipment (UE) IP addresses, and one or more network instances.

In accordance with an exemplary embodiment, the one or more local F-TEIDs and the one or more network instances may be combined respectively in a predefined manner to indicate different traffic endpoints on which the packets are to be detected.

In accordance with an exemplary embodiment, the one or more user equipment IP addresses and the one or more network instances may be combined respectively in a predefined manner to indicate different traffic endpoints on which the packets are to be detected.

In accordance with an exemplary embodiment, the PDI may further comprise multiple framed-routes or framed-IPv6-routes.

In accordance with an exemplary embodiment, the multiple framed-routes or framed-IPv6-routes and the one or more network instances may be combined respectively in a predefined manner to indicate different traffic endpoints on which the packets are to be detected.

In accordance with an exemplary embodiment, the method may further comprise receiving from the second network entity an indication indicating support of multiple traffic endpoints in the PDI.

In accordance with an exemplary embodiment, the first network entity may be a control plane network entity, and the second network entity may be a user plane network entity.

According to a second aspect of the present disclosure, there is provided a method performed by a second network entity. The method comprises receiving packet detection information (PDI) from a first network entity, wherein the PDI indicates information on one or more traffic endpoints on which packets are to be detected.

In accordance with an exemplary embodiment, the method may further comprise performing packet detection based on the PDI.

In accordance with an exemplary embodiment, the method may further comprise transmitting an indication indicating support of multiple traffic endpoints in the PDI.

In accordance with an exemplary embodiment, the method may further comprise configuring an applicability of a quality-of-service, QoS, flow identifier for packets to be detected on a traffic endpoint.

According to a third aspect of the present disclosure, there is provided a first network entity. The first network entity may comprise one or more processors and one or more memories comprising computer program codes. The one or more memories and the computer program codes may be configured to, with the one or more processors, cause the first network entity at least to perform any step of the method according to the first aspect of the present disclosure.

According to a fourth aspect of the present disclosure, there is provided a second network entity. The second network entity may comprise one or more processors and one or more memories comprising computer program codes. The one or more memories and the computer program codes may be configured to, with the one or more processors, cause the second network entity at least to perform any step of the method according to the second aspect of the present disclosure.

According to a fifth aspect of the present disclosure, there is provided a computer-readable medium having computer program codes embodied thereon which, when executed on a computer, cause the computer to perform any step of the method according to the first aspect of the present disclosure.

According to a sixth aspect of the present disclosure, there is provided a computer-readable medium having computer program codes embodied thereon which, when executed on a computer, cause the computer to perform any step of the method according to the second aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
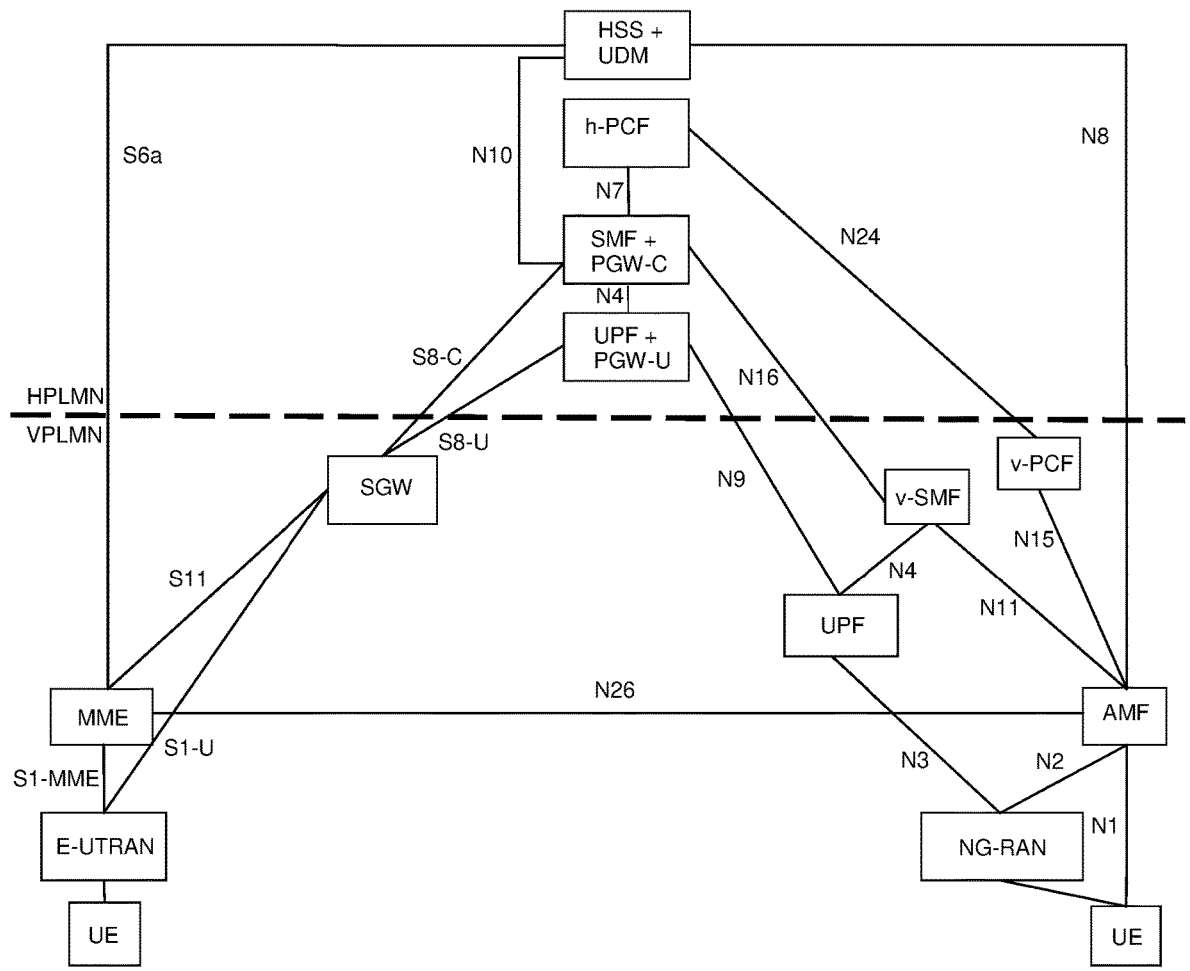
FIG. 1 is a diagram illustrating a home-routed roaming architecture for interworking between the 5G system and EPS.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node or network device may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), an IAB node, a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

The term "network entity" refers to a network device or network function in the EPC network and/or the 5G core network. The network entity may refer to a CP function, a UP function, or any other suitable network device or function. Examples of the CP function may be a packet data network (PDN) gateway (PGW)-control plane (PGW-C), a serving gateway (SGW)-control plane (SGW-C), a traffic detection function (TDF)-control plane (TDF-C), or a session management function (SMF). Examples of the UP function may be a PGW-user plane (PGW-U), an SGW-user plane (SGW-U), a TDF-user plane (TDF-U), or a UPF in the 5GC network. The network entity/function can be implemented either as a network element on a dedicated hardware, as a software instance running on a dedicated hardware, or as a virtualized function instantiated on an appropriate platform, e.g. on a cloud infrastructure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Currently the PDI contains one of the following two sets of information:

Set 1: One occurrence of a traffic endpoint identifier (ID), and

Set 2: A combination of the followings:
One occurrence of local fully-qualified tunnel endpoint identifier (F-TEID),
One occurrence of a network instance,
One occurrence of a user equipment (UE) IP address,
Multiple occurrences of a framed-route associated with the same network instance, and
Multiple occurrences of a framed-IPv6-route associated with the same network instance.

Table 1 illustrates PDI information element (IE) within PFCP (Packet Forwarding Control Protocol) session establishment request, as disclosed in 3GPP TS29.244 V16.0.0.

TABLE 1

| PDI IE within PFCP session establishment request | | | | | | | |
|---|---|---|---|---|---|---|---|
| Octet 1 and 2 | | PDI IE Type = 2 (decimal) | | | | | |
| Octets 3 and 4 | | Length = n | | | | | |
| Information | | | | Appl. | | | |
| elements | P | Condition/Comment | Sxa | Sxb | Sxc | N4 | IE Type |
| Source Interface | M | This IE shall identify the source interface of the incoming packet. | X | X | X | X | Source Interface |
| Local F-TEID | O | This IE shall not be present if Traffic Endpoint ID is present. If present, this IE shall identify the local F-TEID to match for an incoming packet. The CP function shall set the CHOOSE (CH) bit to 1 if the UP function supports the allocation of F-TEID and the CP function requests the UP function to assign a local F-TEID to the PDR. | X | X | — | X | F-TEID |
| Network Instance | O | This IE shall not be present if Traffic Endpoint ID is present. It shall be present if the CP function requests the UP function to allocate a UE IP address/prefix and the Traffic Endpoint ID is not present. If present, this IE shall identify the Network instance to match for the incoming packet. See NOTE 1, NOTE2. | X | X | X | X | Network Instance |

TABLE 1-continued

PDI IE within PFCP session establishment request

| Octet 1 and 2 | | PDI IE Type = 2 (decimal) | | | | | |
|---|---|---|---|---|---|---|---|
| Octets 3 and 4 | | Length = n | | | | | |

| Information elements | P | Condition/Comment | Appl. Sxa | Sxb | Sxc | N4 | IE Type |
|---|---|---|---|---|---|---|---|
| UE IP address | O | This IE shall not be present if Traffic Endpoint ID is present. If present, this IE shall identify the source or destination IP address to match for the incoming packet. (NOTE 5) The CP function shall set the CHOOSE (CH) bit to 1 if the UP function supports the allocation of UE IP address/ prefix and the CP function requests the UP function to assign a UE IP address/prefix to the PDR. | — | X | X | X | UE IP address |
| Traffic Endpoint ID | C | This IE may be present if the UP function has indicated the support of PDI optimization. If present, this IE shall uniquely identify the Traffic Endpoint for that PFCP session. | X | X | X | X | Traffic Endpoint ID |
| SDF Filter | O | If present, this IE shall identify the SDF filter to match for the incoming packet. Several IEs with the same IE type may be present to provision a list of SDF Filters. The full set of applicable SDF filters, if any, shall be provided during the creation or the modification of the PDI. See NOTE 3. | — | X | X | X | SDF Filter |
| Application ID | O | If present, this IE shall identify the Application ID to match for the incoming packet. | — | X | X | X | Application ID |
| Ethernet PDU Session Information | O | This IE may be present to identify all the (DL) Ethernet packets matching an Ethernet PDU session (see clause 5.13.1). | — | — | — | X | Ethernet PDU Session Information |
| Ethernet Packet Filter | O | If present, this IE shall identify the Ethernet PDU to match for the incoming packet. Several IEs with the same IE type may be present to represent a list of Ethernet Packet Filters. The full set of applicable Ethernet Packet filters, if any, shall be provided during the creation or the modification of the PDI. | — | — | — | X | Ethernet Packet Filter |
| QFI | O | If present, this IE shall identify the QoS Flow Identifier to match for the incoming packet. Several IEs with the same IE type may be present to provision a list of QFIs. When present, the full set of applicable QFIs shall be provided during the creation or the modification of the PDI. | — | — | — | X | QFI |
| Framed-Route | O | This IE may be present for a DL PDR if the UPF indicated support of Framed Routing (see clause 8.2.25). If present, this IE shall describe a framed route. Several IEs with the same IE type may be present to provision a list of framed routes. (NOTE 5) | — | X | — | X | Framed-Route |
| Framed-Routing | O | This IE may be present for a DL PDR if the UPF indicated support of Framed Routing (see clause 8.2.25). If present, this IE shall describe a framed route. | — | X | — | X | Framed-Routing |
| Framed-IPv6-Route | O | This IE may be present for a DL PDR if the UPF indicated support of Framed Routing (see clause 8.2.25). If present, this IE shall describe a framed IPv6 route. Several IEs with the same IE type may be present to provision a list of framed IPv6 routes. (NOTE 5) | — | X | — | X | Framed-IPv6-Route |
| Source Interface Type | O | This IE may be present to indicate the 3GPP interface type of the source interface, if required by functionalities in the UP Function, e.g. for performance measurements. | X | X | — | X | 3GPP Interface Type |

NOTE 1:
The Network Instance parameter is needed e.g. in the following cases:
PGW/TDF UP function supports multiple PDNs with overlapping IP addresses;
SGW UP function is connected to PGWs in different IP domains (S5/S8);
PGW UP function is connected to SGWs in different IP domains (S5/S8);
SGW UP function is connected to eNodeBs in different IP domains;
UPF is connected to 5G-ANs in different IP domains.
NOTE 2:
When a Local F-TEID is provisioned in the PDI, the Network Instance shall relate to the IP address of the F-TEID. Otherwise, the Network Instance shall relate to the UE IP address if provisioned or the destination IP address in the SDF filter if provisioned
NOTE 3:
SDF Filter IE(s) shall not be present if Ethernet Packet Filter IE(s) is present.
NOTE 4:
When several SDF filter IEs are provisioned, the UP function shall consider that the packets are matched if matching any SDF filter. The same principle shall apply for Ethernet Packet Filters and QFIs.
NOTE 5:
If both the UE IP Address and the Framed-Route (or Framed-IPv6-Route) are present, the packets which are considered being matching the PDR shall match at least one of them.

According to Table 1, if the traffic endpoint ID is present, the local F-TEID, the network instance, and the UE IP address shall not be present. The traffic endpoint ID may identify a traffic endpoint. Table 2 illustrates Create Traffic Endpoint IE within PFCP session establishment request, as disclosed in 3GPP TS29.244 V16.0.0.

IPv6 prefixes is reachable over a single PDU session. Framed routes are IP routes behind the UE. The UP function advertizes relevant IP routes to receive packets destined to these destination IP addresses or IPv6 prefixes and to forward these packets over the PDU session.

TABLE 2

Create Traffic Endpoint IE within PFCP session establishment request

| Octet 1 and 2 | | Create Traffic Endpoint IE Type = 127(decimal) | | | | | |
| Octets 3 and 4 | | Length = n | | | | | |

| Information elements | P | Condition/Comment | Appl. Sxa | Sxb | Sxc | N4 | IE Type |
| --- | --- | --- | --- | --- | --- | --- | --- |
| Traffic Endpoint ID | M | This IE shall uniquely identify the Traffic Endpoint for that Sx session. | X | X | X | X | Traffic Endpoint ID |
| Local F-TEID | O | If present, this IE shall identify the local F-TEID to match for an incoming packet. The CP function shall set the CHOOSE (CH) bit to 1 if the UP function supports the allocation of F-TEID and the CP function requests the UP function to assign a local F-TEID to the Traffic Endpoint. | X | X | — | X | F-TEID |
| Network Instance | O | This IE shall be present if the CP function requests the UP function to allocate a UE IP address/prefix. If present, this IE shall identify the Network instance to match for the incoming packet. See NOTE 1, NOTE2. | X | X | X | X | Network Instance |
| UE IP address | O | If present, this IE shall identify the source or destination IP address to match for the incoming packet. (NOTE 3) The CP function shall set the CHOOSE (CH) bit to 1 if the UP function supports the allocation of UE IP address/prefix and the CP function requests the UP function to assign a UE IP address/prefix to the Traffic Endpoint. | — | X | X | X | UE IP address |
| Ethernet PDU Session Information | O | This IE may be present to identify all the (DL) Ethernet packets matching an Ethernet PDU session (see clause 5.13.1). | — | — | — | X | Ethernet PDU Session Information |
| Framed-Route | O | This IE may be present for a DL PDR if the UPF indicated support of Framed Routing (see clause 8.2.25). If present, this IE shall describe a framed route. Several IEs with the same IE type may be present to provision a list of framed routes. (NOTE 3) | — | X | — | X | Framed-Route |
| Framed-Routing | O | This IE may be present for a DL PDR if the UPF indicated support of Framed Routing (see clause 8.2.25). If present, this IE shall describe the framed routing associated to a framed route. | — | X | — | X | Framed-Routing |
| Framed-IPv6-Route | O | This IE may be present for a DL PDR if the UPF indicated support of Framed Routing (see clause 8.2.25). If present, this IE shall describe a framed IPv6 route. Several IEs with the same IE type may be present to provision a list of framed IPv6 routes. (NOTE 3) | — | X | — | X | Framed-IPv6-Route |

NOTE 1:
The Network Instance parameter is needed e.g. in the following cases:
PGW/TDF UP function supports multiple PDNs with overlapping IP addresses;
SGW UP function is connected to PGWs in different IP domains (S5/S8);
PGW UP function is connected to SGWs in different IP domains (S5/S8);
SGW UP function is connected to eNodeBs in different IP domains;
UPF is connected to 5G-ANs in different IP domains.
NOTE 2:
When a Local F-TEID is provisioned in the Traffic Endpoint, the Network Instance shall relate to the IP address of the F-TEID. Otherwise, the Network Instance shall relate to the UE IP address.
NOTE 3:
If both the UE IP Address and the Framed-Route (or Framed-IPv6-Route) are present, the packets which are considered being matching the PDR shall match at least one of them.

According to Table 2, the traffic endpoint is identified by the traffic endpoint identifier and information associated with the traffic endpoint may include a local F-TEID, a network instance, a UE IP address, Ethernet protocol data unit (PDU) session information, a framed-route, a framed-routing, and/or a framed-IPv6-route. The traffic endpoint may correspond to a GPRS tunneling protocol (GTP)-u endpoint, an SGi (System Architecture Evolution (SAE) Gateway to Internet) endpoint or an N6 endpoint. Per 3GPP TS29.244 V16.0.0, framed routing allows to support an IP network behind a UE, such that a range of IP addresses or Further, the PDR may be associated to following rules providing a set of instructions to apply to packets matching the PDI:
one or more Forwarding Action Rules (FARs), which contains instructions related to the processing of the packets as follows:
an Apply Action parameter, which indicates whether the UP function shall forward, duplicate, drop or buffer the packet with or without notifying the CP function about the arrival of a downlink (DL) packet;
forwarding, buffering and/or duplicating parameters, which the UP function shall use if the Apply Action parameter requests the packets to be forwarded, buffered or duplicated respectively. These parameters may remain configured in the FAR regardless of the Apply Action parameter value, to minimize the changes to the FAR during the transitions of the UE between the idle and connected modes. The buffering parameters, when present, shall be provisioned in a Buffering Action Rule (BAR) created at the PFCP session level and referenced by the FAR.

NOTE 1: Buffering refers here to the buffering of the packet in the UP function. The UP function is instructed to forward DL packets to the CP function when applying buffering in the CP function.

- zero, one or more QoS Enforcement Rules (QERs), which contains instructions related to QoS enforcement of the traffic;
- zero, one or more Usage Reporting Rules (URRs), which contains instructions related to traffic measurement and reporting.
- one Multi Access Rule (MAR) when the PDR is used for matching DL traffic towards the UE, which contain instructions to apply ATSSS (Access Traffic Steering, Switching, Splitting) feature for a N4 session established for a MA PDU session.

FIG. 1 illustrates a home routed roaming architecture for interworking between the 5G system and EPC/E-UTRAN (Evolved Universal Terrestrial Radio Access Network), as disclosed in 3GPP TS23.501 V16.1.0. Per 3GPP TS23.502 V16.0.0, for home routed roaming, a core network (CN) tunnel for each mapped EPS bearer is allocated by PGW-C+SMF (which is an example of the CP function) at the establishment of a PDU session and QoS flow, preparing for a possible 5GS to EPS handover later. Specifically, the PGW-C+SMF sends an N4 Session Establishment/Modification Request to PGW-U+UPF (which is an example of the UP function). For the home routed roaming scenario, if an EPS bearer identifier (EBI) is assigned successfully, the PGW-C+SMF prepares CN tunnel information for each EPS bearer. If the CN Tunnel information is allocated by the PGW-C+SMF, PGW-U tunnel information for the EPS bearer may be provided to the PGW-U+UPF. If the CN tunnel information is allocated by the PGW-U+UPF, the PGW-U+UPF sends the PGW-U tunnel information for the EPS bearer to the PGW-C+SMF. The PGW-U+UPF is ready to receive uplink (UL) packets from E-UTRAN.

In the home routed roaming scenario, the PGW-C+SMF prepares the CN tunnel information for each EPS bearer and provide it to Visited SMF (V-SMF). Thus when the UE move to the EPC network, the V-SMF does not need to interact with the PGW-C+SMF to get the EPS bearer context(s). If the CN tunnel information is allocated by the PGW-C+SMF and not provided to PGW-U+UPF at PDU session establishment, when the UE moves to the target RAT (Radio Access Technology), the PGW-U+UPF cannot receive UL data until the PGW-C+SMF has provided the tunnel information to the PGW-U+UPF in N4 Session Modification. This causes a short interruption to the UL data transmission during the intersystem handover execution.

Figure 2:
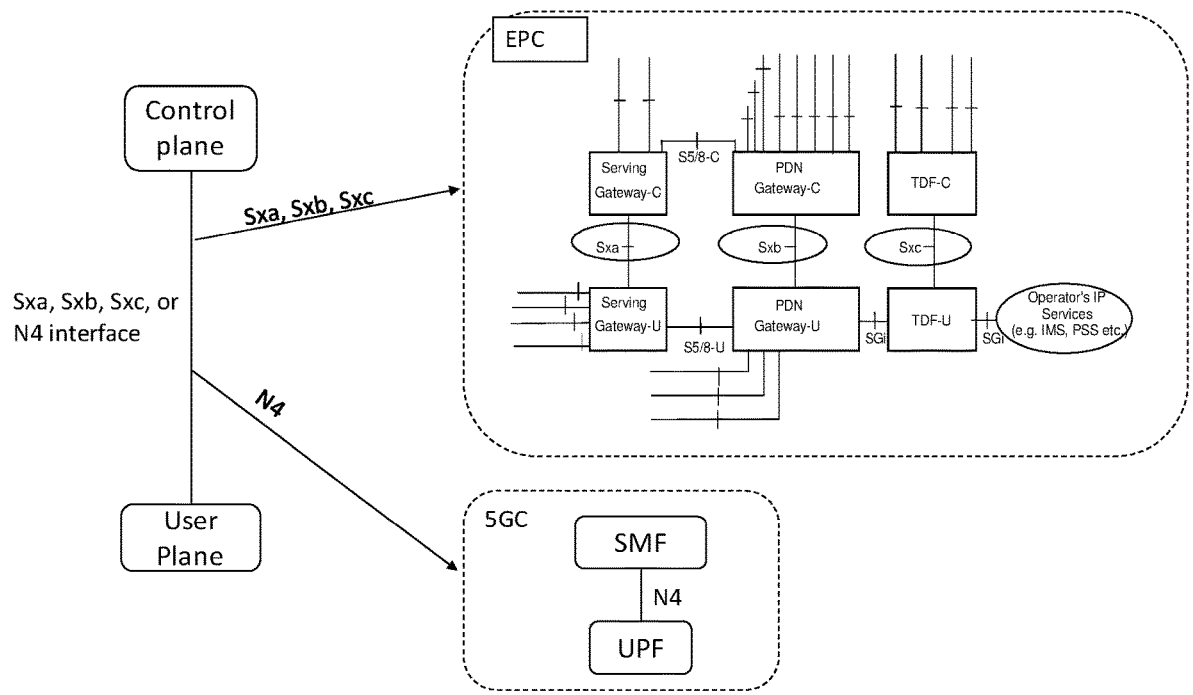
FIG. 2 is a diagram illustrating interfaces between the CP function and the UP function.

In FIG. 1, the PGW-C+SMF may use the PDR to transmit the CN tunnel information to the PGW-U+UPF over an N4 interface. Similar to the N4 interface, the interface between the CP function and the UP function may also be an Sxa interface (between SGW-C and SGW-U), an Sxb interface (between PGW-C and PGW-U), and an Sxc interface (between TDF-C and TDF-U), as mentioned in 3GPP TS TS23.214 v16.0.0. FIG. 2 illustrates the interfaces between the CP function and the UP function.

When the PDU session (and maybe additional QoS flow) are established, if interworking with EPS is supported with an N26 interface, and if the CN tunnel(s) for the mapped EPS bearers are allocated together with the CN tunnel(s) in 5GC (e.g. in the home routed roaming scenario), the PGW-C+SMF must use doubled PDRs because only one occurrence of the traffic endpoint ID (or one occurrence of the local F-TEID, the network instance, etc.) is supported in the PDI currently. Consequently, a message size carrying the PDRs over the N4 interface would be increased, and memory consumption for the PDRs in the PGW-U+UPF would be doubled. Moreover, packet handling (including e.g. packet detection and applying corresponding policies) will take more time as there are extra PDRs to go through.

Therefore, it is desirable to provide an improved PDR provision solution to reduce the signaling overhead for the PDR provision over e.g. the N4 interface, the memory consumption for the PDR in the UPF, and the packet handling time.

Various exemplary embodiments of the present disclosure provide improved solutions for the PDR provision. These solutions may be applied to a first network entity (e.g. a CP network entity) and a second network entity (e.g. an UP network entity). With the improved solutions, the signaling for the PDR provision can be reduced. Moreover, the memory usage in the UP function can be reduced, and the packet handling time can be reduced.

It is noted that some embodiments of the present disclosure are mainly described in relation to 4G and/or 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 3:
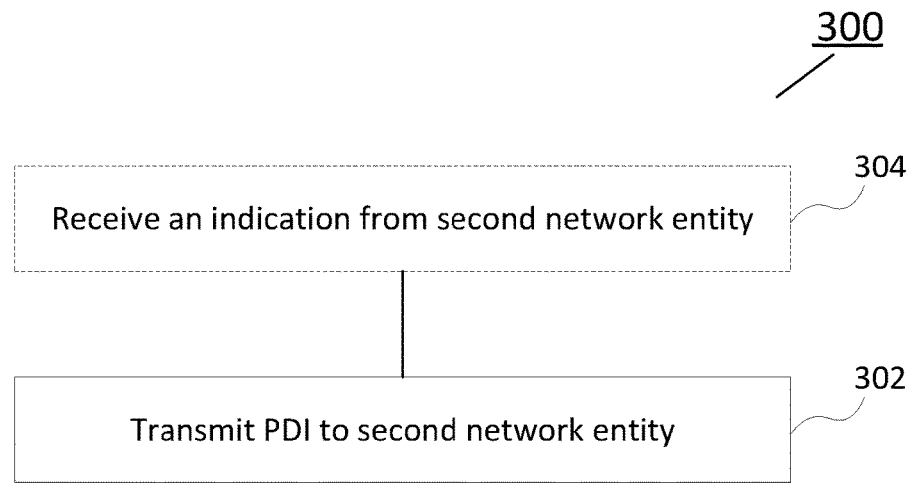
FIG. 3 is a flowchart illustrating a method performed by a first network entity according to some embodiments of the present disclosure.

FIG. 3 is a flowchart illustrating a method 300 according to some embodiments of the present disclosure. The method 300 illustrated in FIG. 3 may be performed by an apparatus implemented in or communicatively coupled to a first network entity. In some embodiments, the first network entity may be the CP function, e.g. PGW-C, SGW-C or TDF-C in the EPC network, or SMF in the 5GC network.

According to the exemplary method 300 illustrated in FIG. 3, the first network entity transmits PDI to a second network entity, as shown in block 302. In some embodiments, the PDI indicates information on one or more traffic endpoints on which packets are to be detected. The traffic endpoint may be a core network (CN) tunnel endpoint (e.g. the GTP-U endpoint), the SGi endpoint, or the N6 endpoint. Thus, the PDI can be used to determine whether the packets to be detected on the traffic endpoints are matched. The PDI may be included in a single PDR and transmitted via the interface between the CP function and the UP function, such as Sxa, Sxb, Sxc, or N4 interface. The PDR may be uni-directional, e.g. uplink or downlink. Accordingly, the information included in the PDI may be different dependent on an applicability of the PDR for uplink packets or downlink packets. In some embodiments, the second network entity may be the UP function, e.g. PGW-U, SGW-U, TDF-U in the EPC network, or the UPF in the 5GC network.

In some embodiments, the PDI may comprise one or more traffic endpoint IDs identifying the one or more traffic endpoints. As shown in Table 2, the information associated with the traffic endpoint may comprise a set of parameters comprising the local F-TEID, the network instance, the UE IP address, the Ethernet PDU session information, the framed-route, the framed-routing, the framed-IPv6-route, or any combination thereof. In some embodiments, the PDI may comprise multiple traffic endpoint IDs to indicate different traffic endpoints from/to which the packets to be detected can be received/transmitted.

Figure 4:
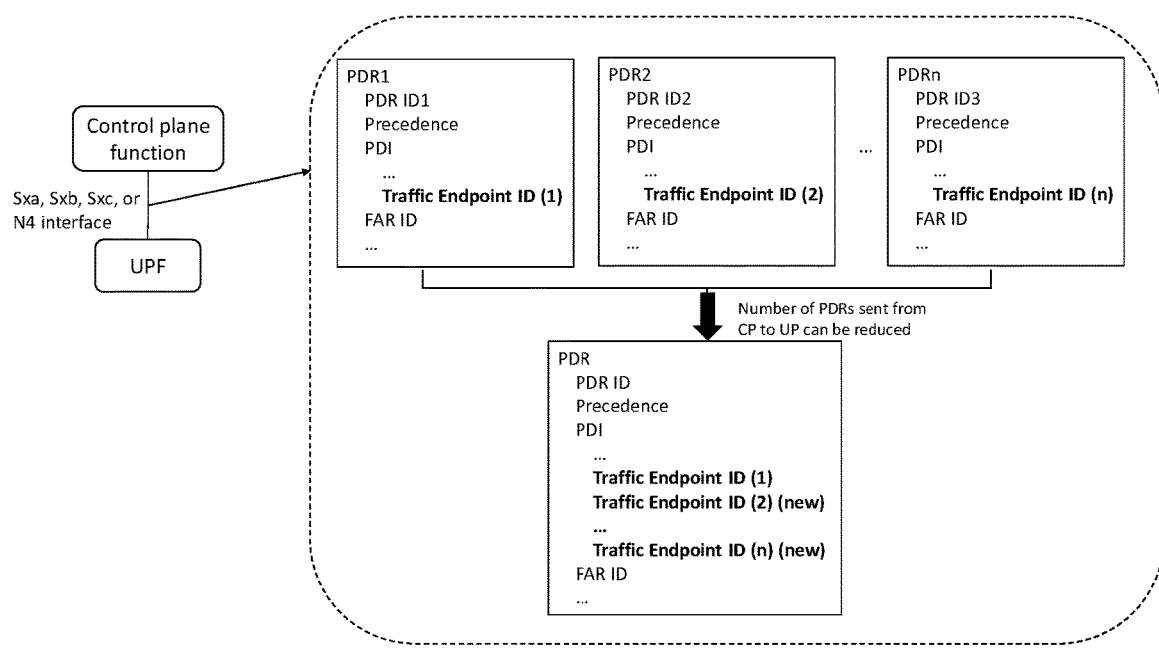
FIG. 4 is a diagram illustrating an example PDR provision according to some embodiments of the present disclosure.

FIG. 4 is a diagram illustrating an example PDR provision according to some embodiments of the present disclosure. In the current solution, due to that the PDI in a single PDR can only comprise one occurrence of the traffic endpoint ID, multiple traffic endpoint IDs need to be provisioned in multiple PDR. As shown in FIG. 4, Traffic Endpoint ID (1) is provisioned in PDR1, Traffic Endpoint ID (2) is provisioned in PDR2, and Traffic Endpoint ID (n) is provisioned in PDRn. With the method according to some embodiments of the present disclosure, the multiple traffic endpoint IDs can be provisioned in only one PDR. Such one PDR may be available for the packets received or transmitted via the multiple different traffic endpoints sharing the same forwarding action (controlled via FAR), usage reporting control (via URR), and QoS enforcement (via QER). Thus, the number of the PDRs can be reduced and the signaling overhead over the Sxa, Sxb, Sxc or N4 interface can be reduced.

In some embodiments, the PDI may comprise one or more local F-TEIDs and/or one or more UE IP addresses and/or one or more network instances to indicate the one or more traffic endpoints.

In some embodiments, the PDI may comprise multiple local F-TEIDs and one network instance. The multiple local F-TEIDs and the one network instance can be combined to indicate multiple different traffic endpoints. In some embodiments, the PDI may comprise multiple local F-TEIDs and multiple network instances. The multiple local F-TEIDs and the multiple network instances can be combined respectively in a predefined manner to indicate multiple different traffic endpoints. For example, the PDI comprises two local F-TEIDs (i.e. F-TEID1, FTEID 2) and two network instances (i.e. NI1, NI2). There may be two combination manners. One manner is to combine each local F-TEID with each network instance to indicate four different traffic endpoints, i.e. F-TEID1 with NI1, F-TEID1 with NI2, F-TEID2 with NI1, and F-TEID2 with NI2. The other manner is to combine the two local F-TEIDs with the two network instances such that each local F-TEID is combined with only one network instance and different local F-TEIDs are combined with different network instances. Thus two different traffic endpoints will be indicated, i.e. F-TEID1 with NI1 and FTEID2 with NI2, or F-TEID1 with NI2 and F-TEID2 with Nil. Either of the two combination manners may be predefined.

In some embodiments, the PDI may comprise multiple UE IP addresses and one network instance. The multiple UE IP addresses and the one network instance can be combined to indicate multiple different traffic endpoints. In some embodiments, the PDI may comprise multiple UE IP addresses and multiple network instances. The multiple UE IP addresses and the multiple network instances can be combined respectively in a predefined manner to indicate multiple different traffic endpoints. For example, the PDI comprises two UE IP addresses (i.e. UE IP Address 1, UE IP Address 2) and two network instances (i.e. NI1, NI2). There may be two combination manners. One manner is to combine each UE IP address with each network instance to indicate four different traffic endpoints, i.e. UE IP Address 1 with NI1, UE IP Address 1 with NI2, UE IP Address 2 with NI1, and UE IP Address 2 with NI2. The other manner is to combine the two UE IP addresses with the two network instances such that each UE IP address is combined with only one network instance and different local F-TEIDs are combined with different network instances. Thus two different traffic endpoints will be indicated, i.e. UE IP Address 1 with NI1 and UE IP Address 2 with NI2, or UE IP Address 1 with NI2 and UE IP Address 2 with NI1.

In some embodiments, the PDI may comprise multiple framed-routes or framed-IPv6-routes together with one or more network instances. In the case of one network instance, the multiple framed-routes or framed-IPv6-routes and the one network instance can be combined respectively to indicate different traffic endpoints. In the case of multiple network instances, the multiple framed-routes or framed-IPv6-routes and the multiple network instances can be combined respectively in a predefined manner to indicate different traffic endpoints. For example, the PDI comprises two framed-routes (i.e. Frame-Route 1, Frame-Route 2) and two network instances (i.e. NI1, NI2). There may be two combination manners. One manner is to combine each framed-route with each network instance to indicate four different traffic endpoints, i.e. Frame-Route 1 with NI1, Frame-Route 1 with NI2, Frame-Route 2 with NI1, and Frame-Route 2 with NI2. The other manner is to combine the two framed-routes with the two network instances such that each framed-route is combined with only one network instance and different local F-TEIDs are combined with different network instances. Thus two different traffic endpoints will be indicated, i.e. Frame-Route 1 with NI1 and Frame-Route 2 with NI2, or Frame-Route 1 with NI2 and Frame-Route 2 with NI1.

Figure 5:
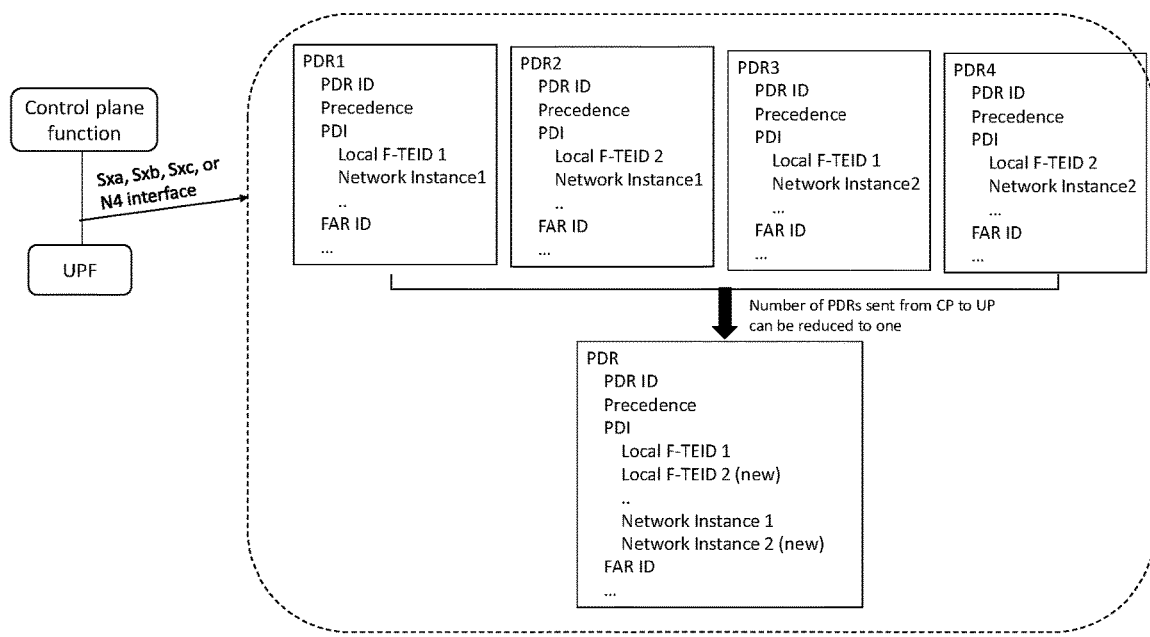
FIG. 5 is a diagram illustrating an example PDR provision according to some embodiments of the present disclosure.

FIG. 5 illustrates an example PDR provision according to some embodiments of the present disclosure, in which two local F-TEIDs and two network instances are provisioned. In the current solution, one occurrence of the local F-TEID and one occurrence of the network instance are included in the PDI of the single PDR, and thus four PDRs are needed. With the method according to some embodiments of the present disclosure, the two local F-TEIDs and the two network instances are included in the PDI of one PDR. Thus, the number of the PDRs sent from the CP function to the UP function can be reduced, thereby reducing the signaling overhead over the interface between the CP function and the UP function.

The QoS flow identifier (QFI) is part of the PDI. When UE is in the 5GC network, the QFI is provisioned in the PDR to perform QoS verification. When UE is in the EPC network, the QFI is not needed. Therefore, there is a need to indicate whether the QFI is available in the PDI. In some embodiments, the PDI may comprise one or more QFIs, and the local F-TEID may further indicate whether the one or more QFIs are applicable for packets to be detected on the traffic endpoint identified by the local F-TEID. In an embodiment, the local F-TEID may use one bit to indicate the availability of the QFI. If applicable, the one or more QFIs shall be used for the packets received or transmitted via the traffic endpoint identified by the local F-TEID.

Figure 6:
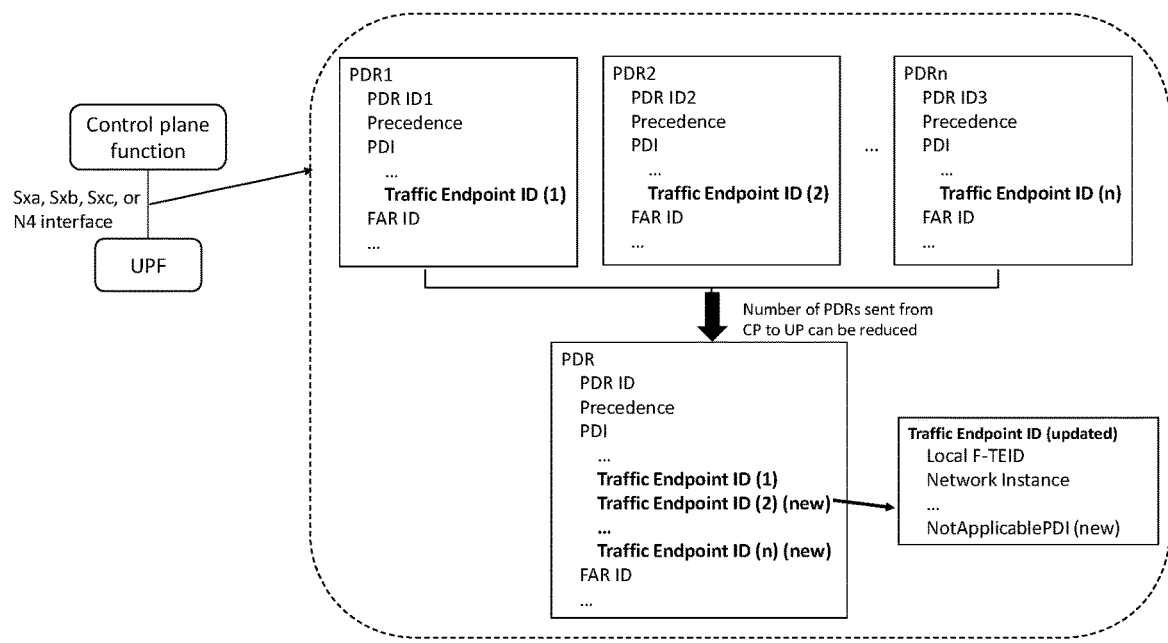
FIG. 6 is a diagram illustrating an example PDR provision according to some embodiments of the present disclosure.

In some embodiments, in the case that the PDI may comprise one or more traffic endpoint IDs and one or more QFIs, the traffic endpoint(s) identified by the traffic endpoint ID(s) may comprise an indication indicating whether the QFI(s) is applicable for packets to be detected on the traffic endpoint(s) identified by the traffic endpoint ID(s). In an embodiment, the indication may be referred to as "NotApplicablePDI" with bitmask encoding, and may use one bit to indicate whether the QFI(s) shall not be used. FIG. 6 illustrates an example PDR provision according to some embodiments of the present disclosure. In FIG. 6, the indication "NotApplicablePDI" is added to the PDI. If applicable, the QFI(s) included in the PDI shall be used for the packets received/transmitted from/to the corresponding traffic endpoint.

Figure 7:
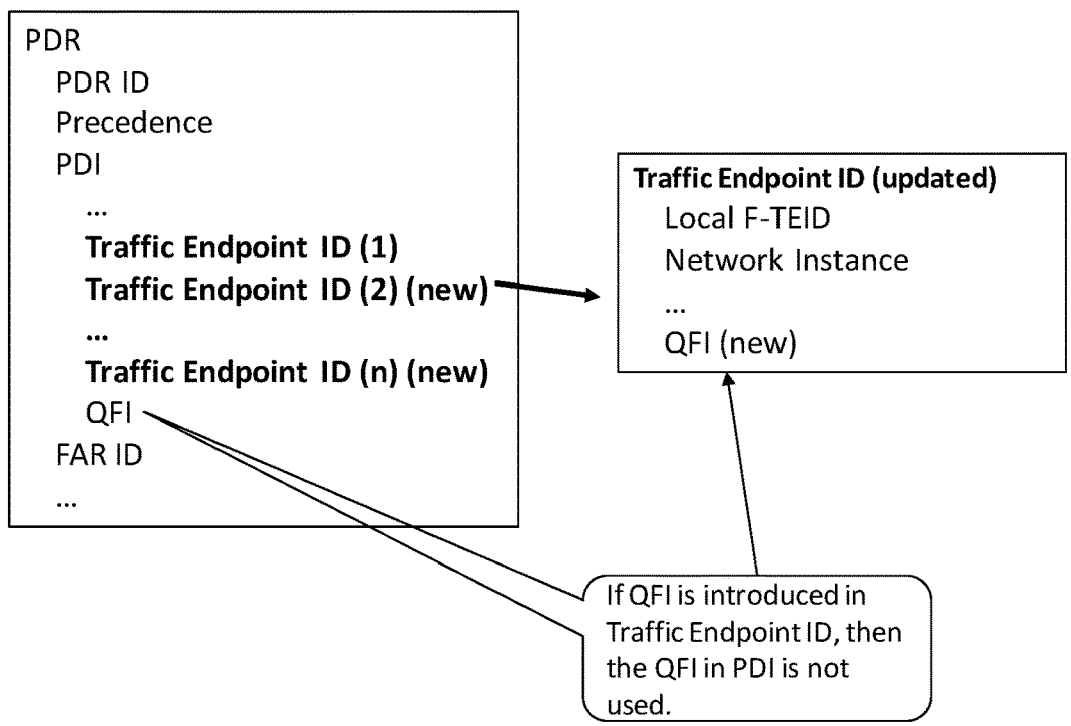
FIG. 7 is a diagram illustrating an example PDR provision according to some embodiments of the present disclosure.

In some embodiments, in the case that the PDI comprises one or more traffic endpoint IDs, the traffic endpoint(s) identified by the traffic endpoint ID(s) may further comprise one or more QFIs, while the PDI does not comprise the QFI(s). Thus, the QFI(s) shall be used for the packets to be detected on the traffic endpoint(s) identified by the traffic endpoint ID(s). FIG. 7 illustrates an example PDR provision according to some embodiments of the present disclosure, in which the traffic endpoint identified by the traffic endpoint ID comprises the QFI(s).

According to the various embodiments of the present disclosure as described above, the PDI IE within PFCP session establishment request may be modified as Table 3:

TABLE 3

| PDI IE within PFCP session establishment request | | | | | | | |
|---|---|---|---|---|---|---|---|
| Octet 1 and 2 | | PDI IE Type = 2 (decimal) | | | | | |
| Octets 3 and 4 | | Length = n | | | | | |
| Information | | | Appl. | | | | |
| elements | P | Condition/Comment | Sxa | Sxb | Sxc | N4 | IE Type |
| Source Interface | M | This IE shall identify the source interface of the incoming packet. | X | X | X | X | Source Interface |
| Local F-TEID | O | This IE shall not be present if Traffic Endpoint ID is present. If present, this IE shall identify the local F-TEID to match for an incoming packet. The CP function shall set the CHOOSE (CH) bit to 1 if the UP function supports the allocation of F-TEID and the CP function requests the UP function to assign a local F-TEID to the PDR. | X | X | — | X | F-TEID |
| Network Instance | O | This IE shall not be present if Traffic Endpoint ID is present. It shall be present if the CP function requests the UP function to allocate a UE IP address/prefix and the Traffic Endpoint ID is not present. If present, this IE shall identify the Network instance to match for the incoming packet. See NOTE 1, NOTE2. | X | X | X | X | Network Instance |
| UE IP address | O | This IE shall not be present if Traffic Endpoint ID is present. If present, this IE shall identify the source or destination IP address to match for the incoming packet. (NOTE 5) The CP function shall set the CHOOSE (CH) bit to 1 if the UP function supports the allocation of UE IP address/prefix and the CP function requests the UP function to assign a UE IP address/prefix to the PDR. | — | X | X | X | UE IP address |
| Traffic Endpoint ID | C | This IE may be present if the UP function has indicated the support of PDI optimization. If present, this IE shall uniquely identify the Traffic Endpoint for that PFCP session. Several IEs with the same IE type may be present to provision several Traffic Endpoints with different Traffic Endpoint IDs, from which the UPF may receive packets pertaining to the same service data flow, if the UPF has indicated it supports MTE feature as specified in subclause 8.2.25. See NOTE 6. | X | X | X | X | Traffic Endpoint ID |
| SDF Filter | O | If present, this IE shall identify the SDF filter to match for the incoming packet. Several IEs with the same IE type may be present to provision a list of SDF Filters. The full set of applicable SDF filters, if any, shall be provided during the creation or the modification of the PDI. See NOTE 3. | — | X | X | X | SDF Filter |
| Application ID | O | If present, this IE shall identify the Application ID to match for the incoming packet. | — | X | X | X | Application ID |
| Ethernet PDU Session Information | O | This IE may be present to identify all the (DL) Ethernet packets matching an Ethernet PDU session (see clause 5.13.1). | — | — | — | X | Ethernet PDU Session Information |
| Ethernet Packet Filter | O | If present, this IE shall identify the Ethernet PDU to match for the incoming packet. Several IEs with the same IE type may be present to represent a list of Ethernet Packet Filters. The full set of applicable Ethernet Packet filters, if any, shall be provided during the creation or the modification of the PDI. | — | — | — | X | Ethernet Packet Filter |
| QFI | O | This IE shall not be present if Traffic Endpoint ID is present and the QFI(s) are included in the Traffic Endpoint. If present, this IE shall identify the QoS Flow Identifier to match for the incoming packet. Several IEs with the same IE type may be present to provision a list of QFIs. When present, the full set of applicable QFIs shall be provided during the creation or the modification of the PDI. | — | — | — | X | QFI |

TABLE 3-continued

PDI IE within PFCP session establishment request

Octet 1 and 2: PDI IE Type = 2 (decimal)
Octets 3 and 4: Length = n

| Information elements | P | Condition/Comment | Sxa | Sxb | Sxc | N4 | IE Type |
|---|---|---|---|---|---|---|---|
| Framed-Route | O | This IE may be present for a DL PDR if the UPF indicated support of Framed Routing (see clause 8.2.25). If present, this IE shall describe a framed route. Several IEs with the same IE type may be present to provision a list of framed routes. (NOTE 5) | — | X | — | X | Framed-Route |
| Framed-Routing | O | This IE may be present for a DL PDR if the UPF indicated support of Framed Routing (see clause 8.2.25). If present, this IE shall describe a framed route. | — | X | — | X | Framed-Routing |
| Framed-IPv6-Route | O | This IE may be present for a DL PDR if the UPF indicated support of Framed Routing (see clause 8.2.25). If present, this IE shall describe a framed IPv6 route. Several IEs with the same IE type may be present to provision a list of framed IPv6 routes. (NOTE 5) | — | X | — | X | Framed-IPv6-Route |
| Source Interface Type | O | This IE may be present to indicate the 3GPP interface type of the source interface, if required by functionalities in the UP Function, e.g. for performance measurements. | X | X | — | X | 3GPP In Type |

NOTE 1:
The Network Instance parameter is needed e.g. in the following cases:
PGW/TDF UP function supports multiple PDNs with overlapping IP addresses;
SGW UP function is connected to PGWs in different IP domains (S5/S8);
PGW UP function is connected to SGWs in different IP domains (S5/S8);
SGW UP function is connected to eNodeBs in different IP domains;
UPF is connected to 5G-ANs in different IP domains.
NOTE 2:
When a Local F-TEID is provisioned in the PDI, the Network Instance shall relate to the IP address of the F-TEID. Otherwise, the Network Instance shall relate to the UE IP address if provisioned or the destination IP address in the SDF filter if provisioned
NOTE 3:
SDF Filter IE(s) shall not be present if Ethernet Packet Filter IE(s) is present.
NOTE 4:
When several SDF filter IEs are provisioned, the UP function shall consider that the packets are matched if matching any SDF filter. The same principle shall apply for Ethernet Packet Filters and QFIs.
NOTE 5:
If both the UE IP Address and the Framed-Route (or Framed-IPv6-Route) are present, the packets which are considered being matching the PDR shall match at least one of them.
NOTE 6:
Several Traffic Endpoint ID containing different Local TEIDs can be provisioned over N4 interface for a PFCP session which is established for a PDU session subject for 5G to EPS mobility with N26 supported.

Moreover, the Create Traffic Endpoint IE within PFCP session establishment request may be modified to add QFI, as shown in Table 4:

TABLE 4

Create Traffic Endpoint IE within PFCP session establishment request

Octet 1 and 2: Create Traffic Endpoint IE Type = 127(decimal)
Octets 3 and 4: Length = n

| Information elements | P | Condition/Comment | Sxa | Sxb | Sxc | N4 | IE Type |
|---|---|---|---|---|---|---|---|
| Traffic Endpoint ID | M | This IE shall uniquely identify the Traffic Endpoint for that Sx session. | X | X | X | X | Traffic Endpoint ID |
| Local F-TEID | O | If present, this IE shall identify the local F-TEID to match for an incoming packet. The CP function shall set the CHOOSE (CH) bit to 1 if the UP function supports the allocation of F-TEID and the CP function requests the UP function to assign a local F-TEID to the Traffic Endpoint. | X | X | — | X | F-TEID |
| Network Instance | O | This IE shall be present if the CP function requests the UP function to allocate a UE IP address/prefix. If present, this IE shall identify the Network instance to match for the incoming packet. See NOTE 1, NOTE2. address to match for the incoming packet. (NOTE 3) The CP function shall set the CHOOSE (CH) bit to 1 if the UP function supports the allocation of UE IP address/prefix and the CP function requests the UP function to assign a UE IP address/prefix to the Traffic Endpoint. | X — | X X | X X | X X | Network Instance UE IP address |

TABLE 4-continued

Create Traffic Endpoint IE within PFCP session establishment request

Octet 1 and 2 — Create Traffic Endpoint IE Type = 127(decimal)
Octets 3 and 4 — Length = n

| Information elements | P | Condition/Comment | Sxa | Sxb | Sxc | N4 | Appl. IE Type |
|---|---|---|---|---|---|---|---|
| Ethernet PDU Session Information | O | This IE may be present to identify all the (DL) Ethernet packets matching an Ethernet PDU session (see clause 5.13.1). | — | — | — | X | Ethernet PDU Session Information |
| Framed-Route | O | This IE may be present for a DL PDR if the UPF indicated support of Framed Routing (see clause 8.2.25). If present, this IE shall describe a framed route. Several IEs with the same IE type may be present to provision a list of framed routes. (NOTE 3) | — | X | — | X | Framed-Route |
| Framed-Routing | O | This IE may be present for a DL PDR if the UPF indicated support of Framed Routing (see clause 8.2.25). If present, this IE shall describe the framed routing associated to a framed route. | — | X | — | X | Framed-Routing |
| Framed-IPv6-Route | O | This IE may be present for a DL PDR if the UPF indicated support of Framed Routing (see clause 8.2.25). If present, this IE shall describe a framed IPv6 route. Several IEs with the same IE type may be present to provision a list of framed IPv6 routes. (NOTE 3) | — | X | — | X | Framed-IPv6-Route |
| QFI | O | This IE may be present if the UPF has indicated it supports MTE feature as specified in subclause 8.2.25. If present, this IE shall identify the QoS Flow Identifier to match for the incoming packet received from the traffic endpoint. Several IEs with the same IE type may be present to provision a list of QFIs. When present, the full set of applicable QFIs shall be provided. | — | — | — | — | QFI |

NOTE 1:
The Network Instance parameter is needed e.g. in the following cases:
PGW/TDF UP function supports multiple PDNs with overlapping IP addresses;
SGW UP function is connected to PGWs in different IP domains (S5/S8);
PGW UP function is connected to SGWs in different IP domains (S5/S8);
SGW UP function is connected to eNodeBs in different IP domains;
UPF is connected to 5G-ANs in different IP domains.
NOTE 2:
When a Local F-TEID is provisioned in the Traffic Endpoint, the Network Instance shall relate to the IP address of the F-TEID. Otherwise, the Network Instance shall relate to the UE IP address.
NOTE 3:
If both the UE IP Address and the Framed-Route (or Framed-IPv6-Route) are present, the packets which are considered being matching the PDR shall match at least one of them.

In some embodiments, prior to transmitting the PDI to the second network entity, the first network entity may receive from the second network entity an indication indicating that the second network entity supports multiple traffic endpoints (MTE) in the PDI, as shown in block 304 in FIG. 3. The indication may be received in a PFCP Association Setup/Update Request/Response message during a PFCP Association Setup/Update procedure.

Figure 8:
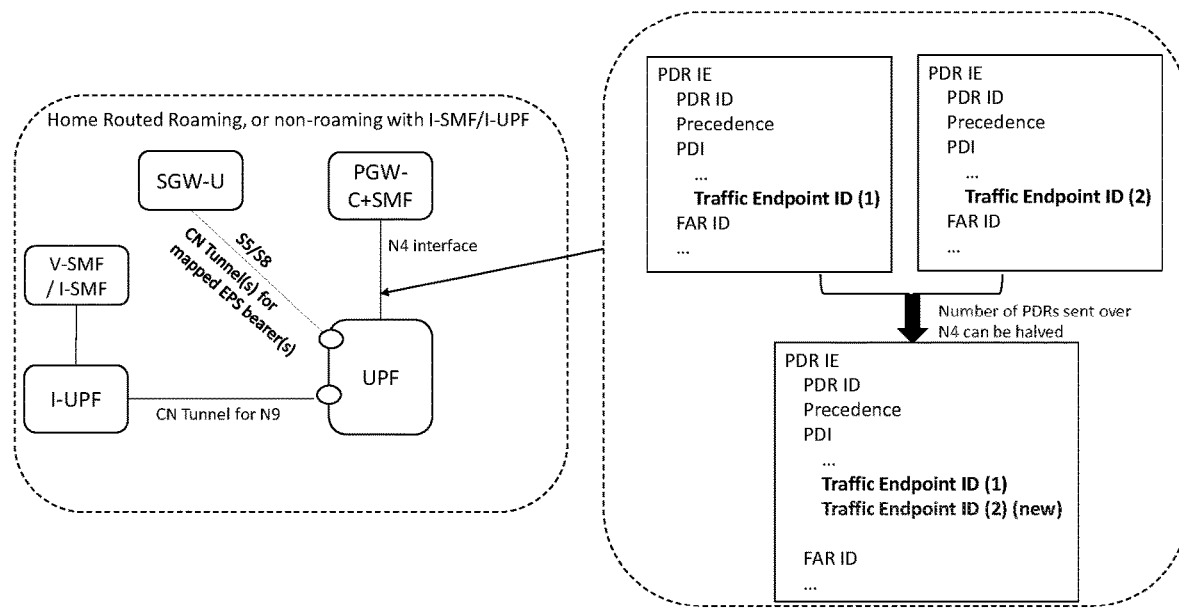
FIG. 8 is a diagram illustrating an example use case in which the method as shown in FIG. 3 can be implemented.

FIG. 8 illustrates an example use case in which the method as shown in FIG. 3 can be implemented. This example use case relates to home routed roaming or non-roaming but with Intermediate-SMF (I-SMF)/Intermediate-UPF (I-UPF) involved, interworking with EPS using N26. In this example use case, when a PDU session (and optionally additional QoS flow) is established, the CN tunnel(s) for mapped EPS bearer(s) (i.e. S5/S8-U tunnel) is allocated together with the CN tunnel(s) in 5GC (i.e. N9 tunnel). Then the PGW-C+SMF includes the traffic endpoint ID (1) for the S5/S8-U tunnel and the traffic endpoint ID (2) for the N9 tunnel for in the same PDI, and transmits the PDR comprising such PDI to the UPF over the N4 interface.

Figure 9:
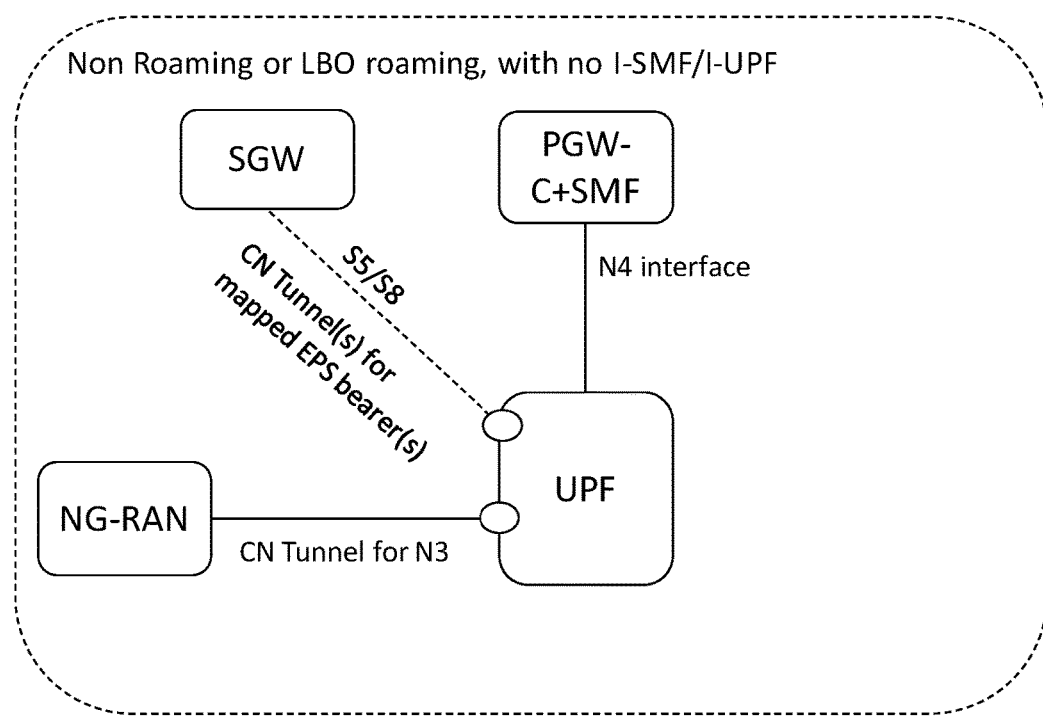
FIG. 9 is a diagram illustrating an example use case in which the method as shown in FIG. 3 can be implemented.

FIG. 9 illustrates another example use case in which the method as shown in FIG. 3 can be implemented. This example use case relates to non-roaming or Local Breakout (LBO) roaming without I-SMF/I-UPF. In this example use case, if the CN tunnel(s) for mapped EPS bearer(s) (i.e. S5/S8-U tunnel) is allocated together with the CN tunnel(s) in 5GC (i.e. N3 tunnel), the PGW-C+SMF includes the traffic endpoint ID (1) for the S5/S8-U tunnel and the traffic endpoint ID (2) for the N3 tunnel in the same PDI, and transmits the PDR comprising such PDI to the UPF over the N4 interface.

Figure 10:
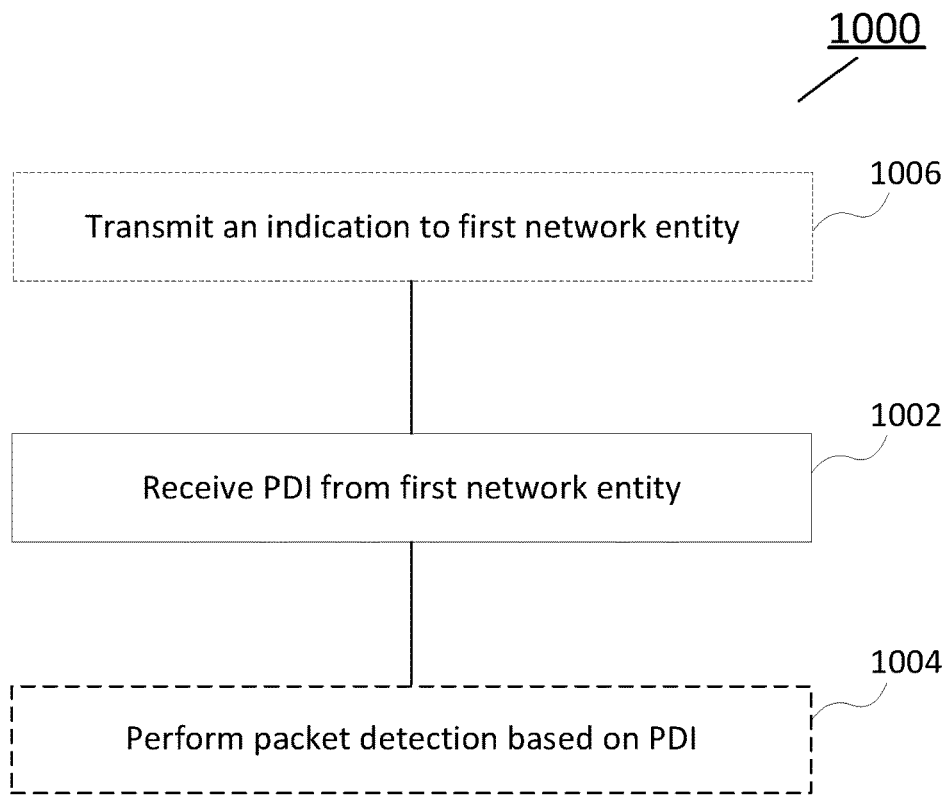
FIG. 10 is a flowchart illustrating a method performed by a second network entity according to some embodiments of the present disclosure.

FIG. 10 is a flowchart illustrating a method 1000 according to some embodiments of the present disclosure. The method 1000 as shown in FIG. 10 may be performed by an apparatus implemented in or communicatively coupled to a second network entity. In some embodiments, the second network entity may be the UP function, e.g. PGW-U, SGW-U or TDF-U in the EPC network, or UPF in the 5GC network.

According to the exemplary method 1000 illustrated in FIG. 10, the second network entity receives the PDI from the first network entity, as shown in block 1002. As described above, the PDI indicates the information on one or more traffic endpoints on which packets are to be detected. The PDI may be received in the PDR. In some embodiments, the first network entity may be the CP function, such as PGW-C, SGW-C or TDF-C in the EPC network, or SMF in the 5GC network.

The details of the PDI have been described above in conjunction with FIGS. 3 to 9, and will be omitted herein.

In some embodiments, upon receipt of the PDI, the second network entity may perform the packet detection based on the received PDI, as shown in block 1004. The second network entity may detect whether the received/transmitted packets are matched against the PDI, and performs the corresponding policies on the packets matching the PDI.

In some embodiment, the second network entity may transmit the indication indicating support of multiple traffic endpoints in the PDI, as shown in block 1006. This indication may be included in UP Function Features IE and transmitted in the PFCP Association Setup/Update Request/Response message during the PFCP Association Setup/Update procedure. The UP Function Features IE indicates the features supported by the UP function. It is coded as follows:

| Octets | Bits | | | | | | | |
|---|---|---|---|---|---|---|---|---|
| | 8 | 7 | 6 | 5 | 4 | 3 | 2 | 1 |
| 1 to 2 | Type = 43 (decimal) | | | | | | | |
| 3 to 4 | Length = n | | | | | | | |
| 5 to 6 | Supported-Features | | | | | | | |
| 7 to 8 | Additional Supported-Features 1 | | | | | | | |
| 9 to (n + 4) | These octet(s) is/are present only if explicitly specified | | | | | | | |

The UP Function Features IE takes the form of a bitmask where each bit set indicates that the corresponding feature is supported. Table 5 specifies the features defined on PFCP interfaces and the interfaces on which they apply.

TABLE 5

UP Function Features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.x). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/X | MTE | N4 | UPF supports multiple instances of Traffic Endpoint IDs in a PDI. |

Feature Octet/Bit: The octet and bit number within the Supported-Features IE, e.g. "5 /1".

Feature: A short name that can be used to refer to the octet/bit and to the feature.

Interface: A list of applicable interfaces to the feature.

Description: A clear textual description of the feature.

In some embodiments, the second network entity may configure an applicability of the QFI(s) for packets to be detected on a traffic endpoint. Thus the second network entity can know that the QFI(s) shall not be used for the packets over a certain traffic endpoint. For example, the QFI shall not be used for the packets over the traffic endpoints other than N3 or N9.

The various blocks shown in FIGS. 3 and 10 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 11:
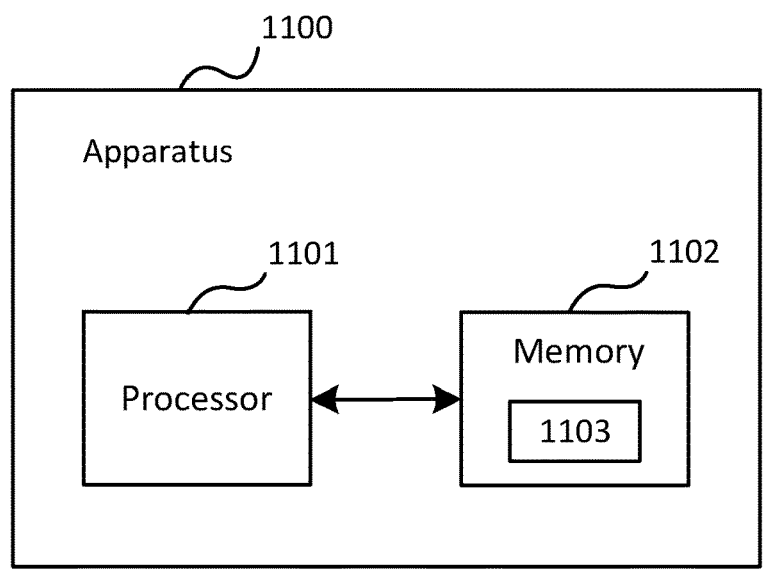
FIG. 11 is a block diagram illustrating an apparatus according to some embodiments of the present disclosure.

FIG. 11 is a block diagram illustrating an apparatus 1100 according to various embodiments of the present disclosure. As shown in FIG. 11, the apparatus 1100 may comprise one or more processors such as processor 1201 and one or more memories such as memory 1102 storing computer program codes 1103. The memory 1102 may be non-transitory machine/processor/computer readable storage medium. In accordance with some exemplary embodiments, the apparatus 1100 may be implemented as an integrated circuit chip or module that can be plugged or installed into the first network entity as described with respect to FIG. 3, or the second network entity as described with respect to FIG. 10.

In some implementations, the one or more memories 1102 and the computer program codes 1103 may be configured to, with the one or more processors 1101, cause the apparatus 1100 at least to perform any operation of the method as described in connection with FIG. 3. In such embodiments, the apparatus 1100 may be implemented as at least part of or communicatively coupled to the first network entity as described above. As a particular example, the apparatus 1100 may be implemented as the first network entity.

In other implementations, the one or more memories 1102 and the computer program codes 1103 may be configured to, with the one or more processors 1101, cause the apparatus 1100 at least to perform any operation of the method as described in connection with FIG. 10. In such embodiments, the apparatus 1100 may be implemented as at least part of or communicatively coupled to the second network entity as described above. As a particular example, the apparatus 1100 may be implemented as the second network entity.

Alternatively or additionally, the one or more memories 1102 and the computer program codes 1103 may be configured to, with the one or more processors 1101, cause the apparatus 1100 at least to perform more or less operations to implement the proposed methods according to the exemplary embodiments of the present disclosure.

Figure 12:
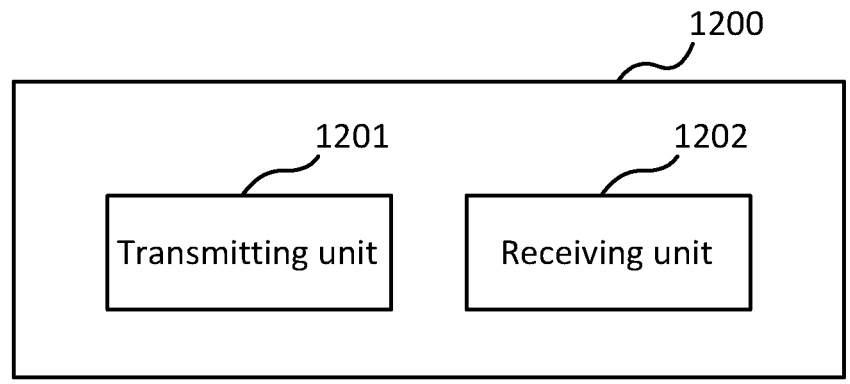
FIG. 12 is a block diagram illustrating an apparatus according to some embodiments of the present disclosure.

FIG. 12 is a block diagram illustrating an apparatus 1200 according to some embodiments of the present disclosure. As shown in FIG. 12, the apparatus 1200 may comprise a transmitting unit 1201. In an exemplary embodiment, the apparatus 1200 may be implemented in the first network entity such as a CP function (e.g. PGW-C, SMF, etc.). The transmitting unit 1201 may be configured to carry out the operation in block 302. Further, the apparatus 1200 may comprise a receiving unit 1202 configured to carry out the operation in block 304. Optionally, the transmitting unit 1201 and/or the receiving unit 1202 may be configured to carry out more or less operations to implement the proposed methods according to the exemplary embodiments of the present disclosure.

Figure 13:
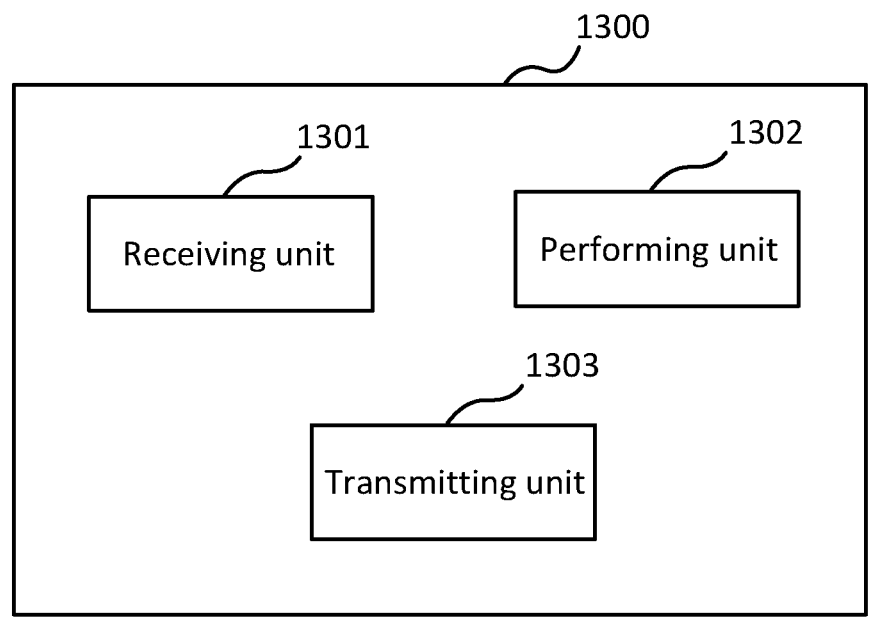
FIG. 13 is a block diagram illustrating an apparatus according to some embodiments of the present disclosure.

FIG. 13 is a block diagram illustrating an apparatus 1300 according to some embodiments of the present disclosure. As shown in FIG. 13, the apparatus 1300 may comprise a receiving unit 1301. In an exemplary embodiment, the apparatus 1300 may be implemented in the second network entity such as a UP function (e.g. PGW-U, UPF, etc.). The receiving unit 1301 may be configured to carry out the operation in block 1002. Further, the apparatus 1300 may also comprise a performing unit 1302 configured to carry out the operation in block 1004 and a transmitting unit 1303 configured to carry out the operation in block 1006. Optionally, the receiving unit 1301, the performing unit 1302 and/or the transmitting unit 1303 may be configured to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first network entity, comprising:
receiving from a second network entity an indication that the second network entity supports multiple instances of traffic endpoint identifiers (IDs) in packet detection information (PDI);
transmitting to the second network entity a session establishment request comprising a PDI information element (IE) comprising a first traffic endpoint ID IE and a second traffic endpoint ID IE, wherein
the first traffic endpoint ID IE includes a first traffic endpoint value, and
the second traffic endpoint ID IE includes a second traffic endpoint value, wherein
the session establishment request further comprises a create traffic endpoint IE that comprises a QoS flow identifier (QFI) and the QFI is not included in the PDI IE.

2. The method of claim 1, wherein
the first traffic endpoint value pertains to a first service data flow, and
the second traffic endpoint value also pertains to said first service data flow.

3. The method of claim 1, wherein
the first network entity is a control plane network entity, and
the second network entity is a user plane network entity.

4. A method performed by a second network entity, comprising:
receiving from a first network entity a session establishment request comprising a packet detection information (PDI) information element (IE) comprising i) a first traffic endpoint ID IE comprising a first traffic endpoint value and ii) a second traffic endpoint ID IE comprising a second traffic endpoint value;
performing packet detection based on information included in the PDI IE; and
transmitting an indication indicating support of multiple traffic endpoints, wherein
the session establishment request further comprises a create traffic endpoint IE that comprises a QoS flow identifier (QFI) and the QFI is not included in the PDI IE.

5. The method of claim 4, wherein
the first traffic endpoint value pertains to a first service data flow, and
the second traffic endpoint value also pertains to said first service data flow.

6. The method of claim 4, wherein
the session establishment request is a request for establishing a Packet Forwarding Control Protocol (PFCP) session,
the first traffic endpoint ID IE comprises information uniquely identifying a first traffic endpoint for the PFCP session, and
the second traffic endpoint ID IE comprises information uniquely identifying a second traffic endpoint for the PFCP session.

7. The method of claim 4, further comprising:
configuring an applicability of a quality-of-service (QOS) flow identifier for packets to be detected on a traffic endpoint.

8. The method of claim 4, wherein
the first network entity is a control plane network entity, and
the second network entity is a user plane network entity.

9. A first network entity comprising:
memory; and
processing circuitry, wherein the first network entity is configured to perform a method comprising:
transmitting to the second network entity a session establishment request comprising a packet detection information (PDI) information element (IE) comprising a first traffic endpoint ID IE and a second traffic endpoint ID IE, wherein
the first traffic endpoint ID IE includes a first traffic endpoint value,
the second traffic endpoint ID IE includes a second traffic endpoint value, and
the session establishment request further comprises a create traffic endpoint IE that comprises a QoS flow identifier (QFI) and the QFI is not included in the PDI IE.

10. The first network entity of claim 9, wherein
the first traffic endpoint value pertains to a first service data flow, and
the second traffic endpoint value also pertains to said first service data flow.

11. The first network entity of claim 9, wherein
session establishment request is a request for establishing a Packet Forwarding Control Protocol (PFCP) session,
the first traffic endpoint ID IE comprises information uniquely identifying a first traffic endpoint for the PFCP session, and
the second traffic endpoint ID IE comprises information uniquely identifying a second traffic endpoint for the PFCP session.

12. The first network entity of claim 9, wherein the first network entity is further configured to receive, from the second network entity, an indication indicating support of multiple traffic endpoints in the PDI.

13. The first network entity of claim 9, wherein
the first network entity is a control plane network entity, and
the second network entity is a user plane network entity.

14. A second network entity comprising:
memory;
processing circuitry; and
a receiver for receiving from a first network entity a session establishment request comprising a packet detection information (PDI) information element (IE) comprising i) a first traffic endpoint ID IE comprising a first traffic endpoint value and ii) a second traffic endpoint ID IE comprising a second traffic endpoint value, wherein
the second network entity is configured to perform packet detection based on information included in the received PDI IE, and
the session establishment request further comprises a create traffic endpoint IE that comprises a QoS flow identifier (QFI) and the QFI is not included in the PDI IE.

15. The second network entity of claim 14, wherein the network entity is further configured to:
  transmit an indication indicating support of multiple traffic endpoints in the PDI.

16. The second network entity of claim 14, wherein
  the first traffic endpoint value pertains to a first service data flow, and
  the second traffic endpoint value also pertains to said first service data flow.

17. The second network entity of claim 14, wherein
  the session establishment request is a request for establishing a Packet Forwarding Control Protocol (PFCP) session,
  the first traffic endpoint ID IE comprises information uniquely identifying a first traffic endpoint for the PFCP session, and
  the second traffic endpoint ID IE comprises information uniquely identifying a second traffic endpoint for the PFCP session.

18. The second network entity of claim 14, wherein the second network entity is further configured to configure an applicability of a quality-of-service (QOS) flow identifier for packets to be detected on a traffic endpoint.

19. The second network entity of claim 14, wherein the first network entity is a control plane network entity, and the second network entity is a user plane network entity.

* * * * *

UNITED STATES PATENT AND TRADEMARK OFFICE
CERTIFICATE OF CORRECTION

| | | |
|---|---|---|
| PATENT NO. | : 12,231,341 B2 | Page 1 of 1 |
| APPLICATION NO. | : 17/635455 | |
| DATED | : February 18, 2025 | |
| INVENTOR(S) | : Yang et al. | |

It is certified that error appears in the above-identified patent and that said Letters Patent is hereby corrected as shown below:

On the Title Page

On Page 2, in Item (56), under "OTHER PUBLICATIONS", in Column 1, Line 19, delete "Framed-IPV6-Route" and insert -- Framed-IPv6-Route --, therefor.

In the Specification

In Columns 5 & 6, in TABLE 1, under "Information elements", Line 2, delete "Intelface" and insert -- Interface --, therefor.

In Columns 7 & 8, in TABLE 1-continued, under "IE Type", Line 11, delete "QFl" and insert -- QFI --, therefor.

In Column 13, Line 52, delete "Nil." and insert -- NI1. --, therefor.

In Column 14, Line 9, delete "NIL" and insert -- NI1. --, therefor.

In Columns 17 & 18, in TABLE 3-continued, under "IE Type", Line 4, delete "In" and insert -- Interface --, therefor.

In Columns 17 & 18, in TABLE 4, under "Condition/Comment", Line 13, delete "address to match for the incoming packet. (NOTE 3)" and insert -- , therefor.

In the Claims

In Column 26, Line 5, in Claim 7, delete "(QOS)" and insert -- (QoS) --, therefor.

In Column 27, Line 22, in Claim 18, delete "(QOS)" and insert -- (QoS) --, therefor.

Signed and Sealed this
Twelfth Day of August, 2025

Coke Morgan Stewart
*Acting Director of the United States Patent and Trademark Office*